United States Patent Office 3,353,963
Patented Nov. 21, 1967

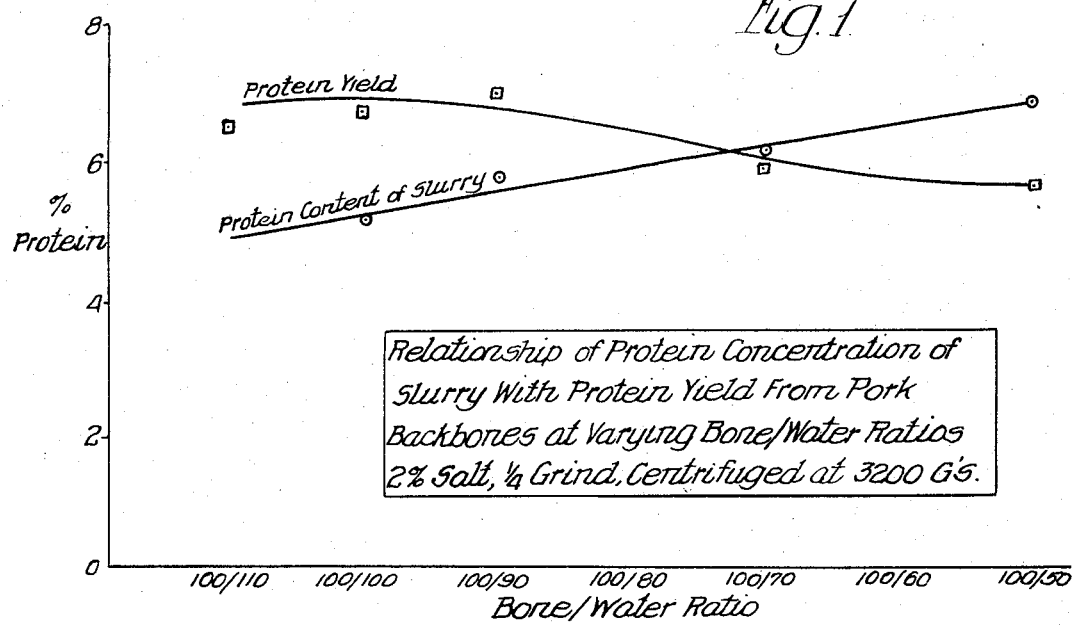
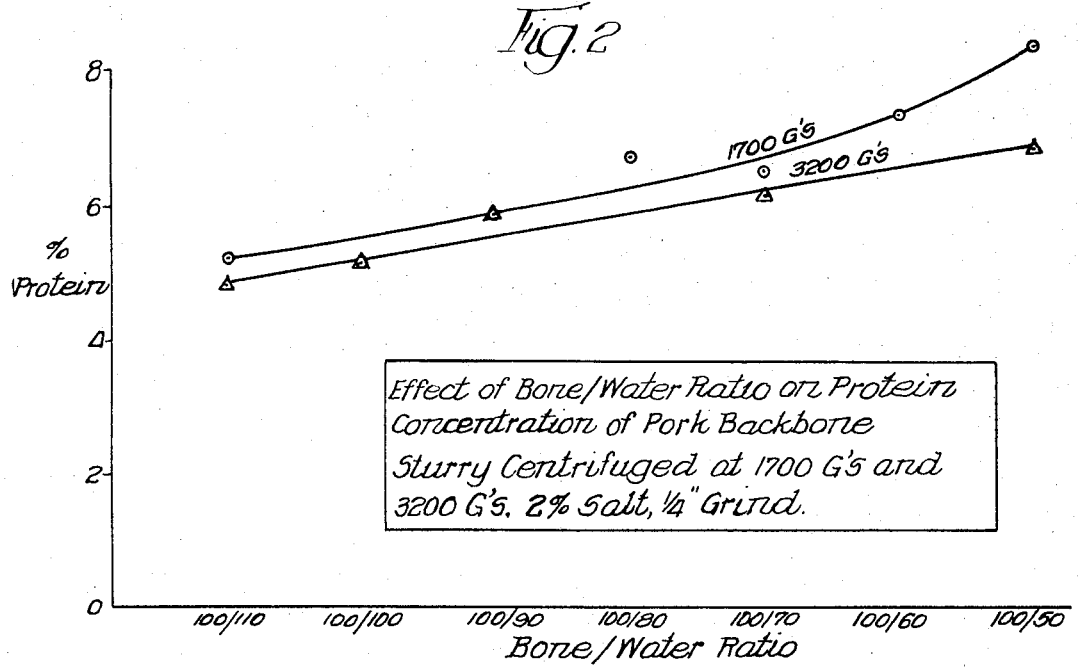

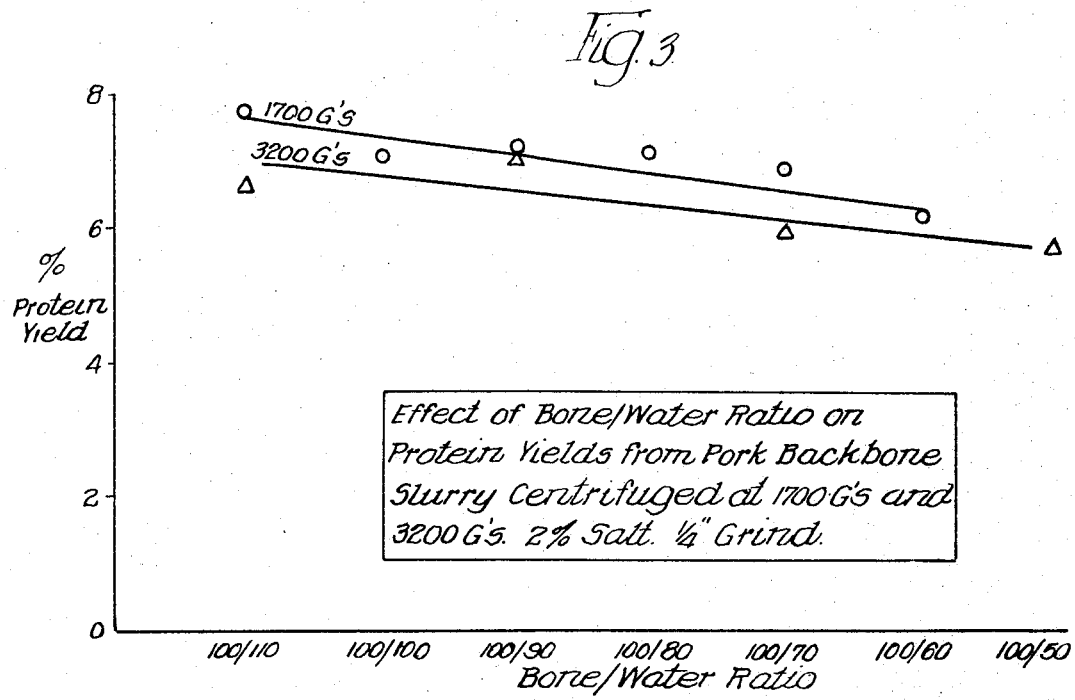
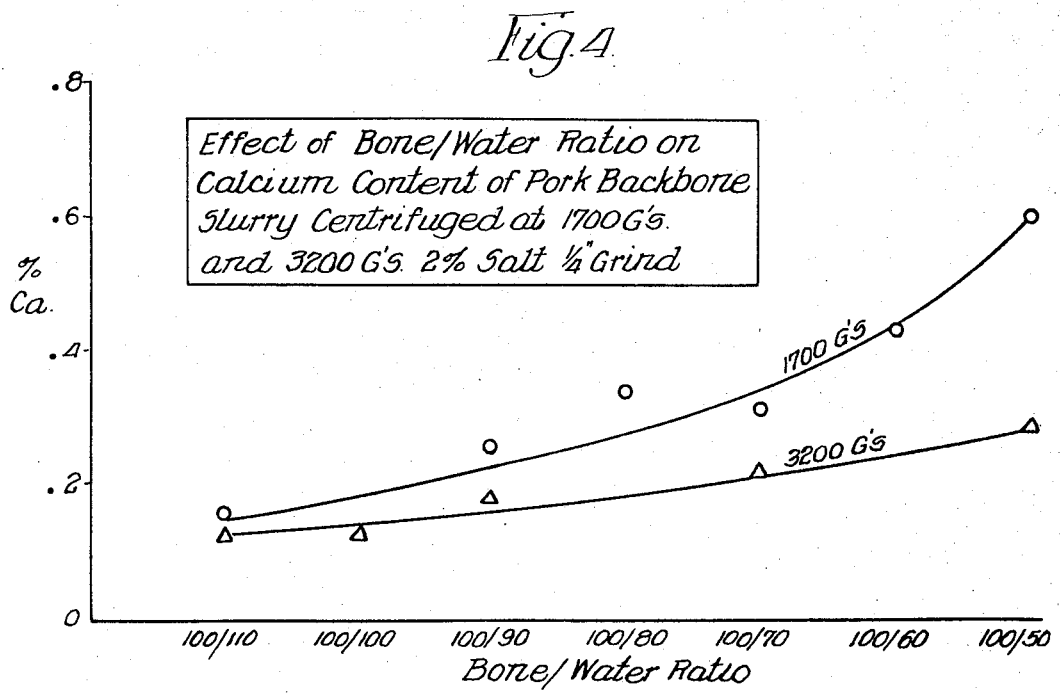

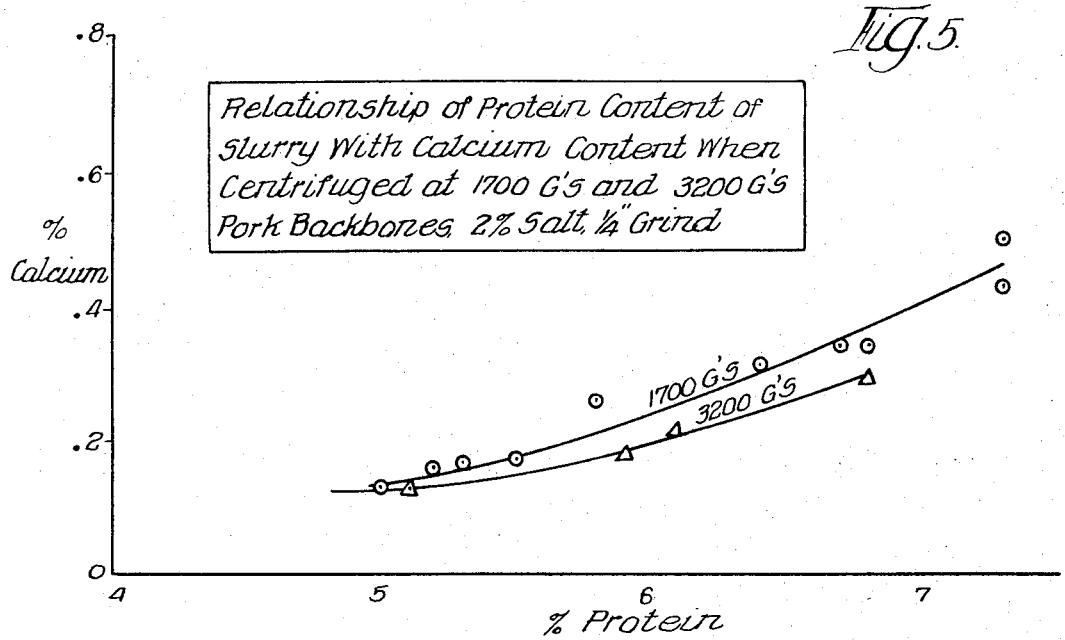
Fig. 5. Relationship of Protein Content of Slurry With Calcium Content When Centrifuged at 1700 G's and 3200 G's Pork Backbones, 2% Salt, ¼" Grind
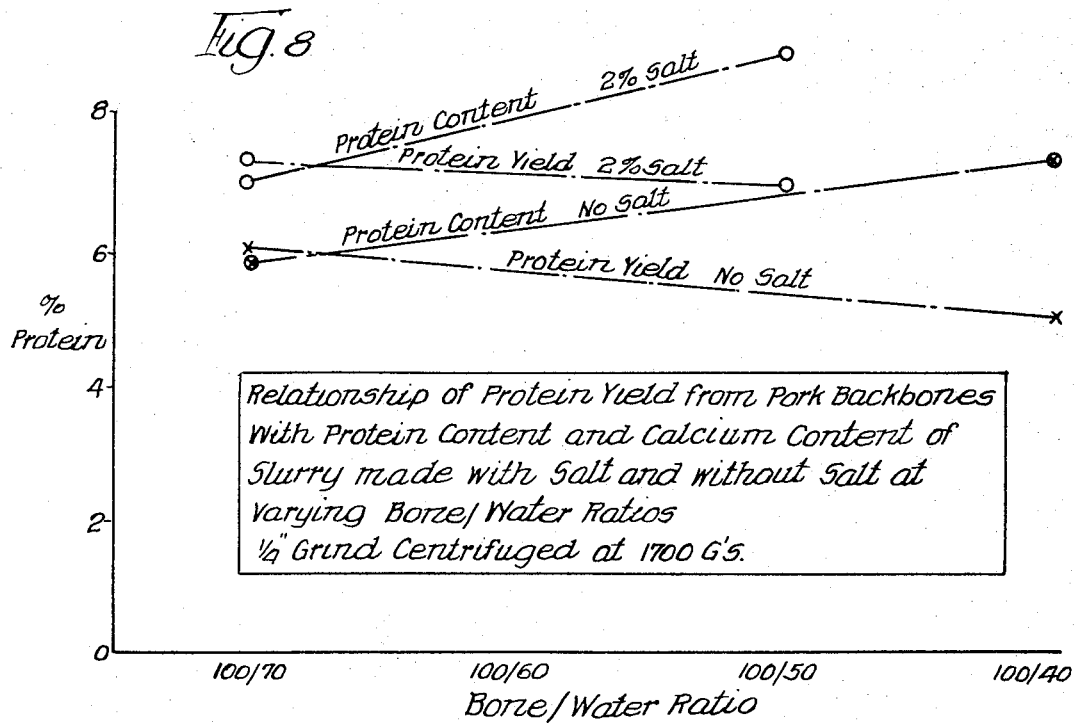
Fig. 8. Relationship of Protein Yield from Pork Backbones With Protein Content and Calcium Content of Slurry made with Salt and without Salt at Varying Bone/Water Ratios ¼" Grind Centrifuged at 1700 G's.

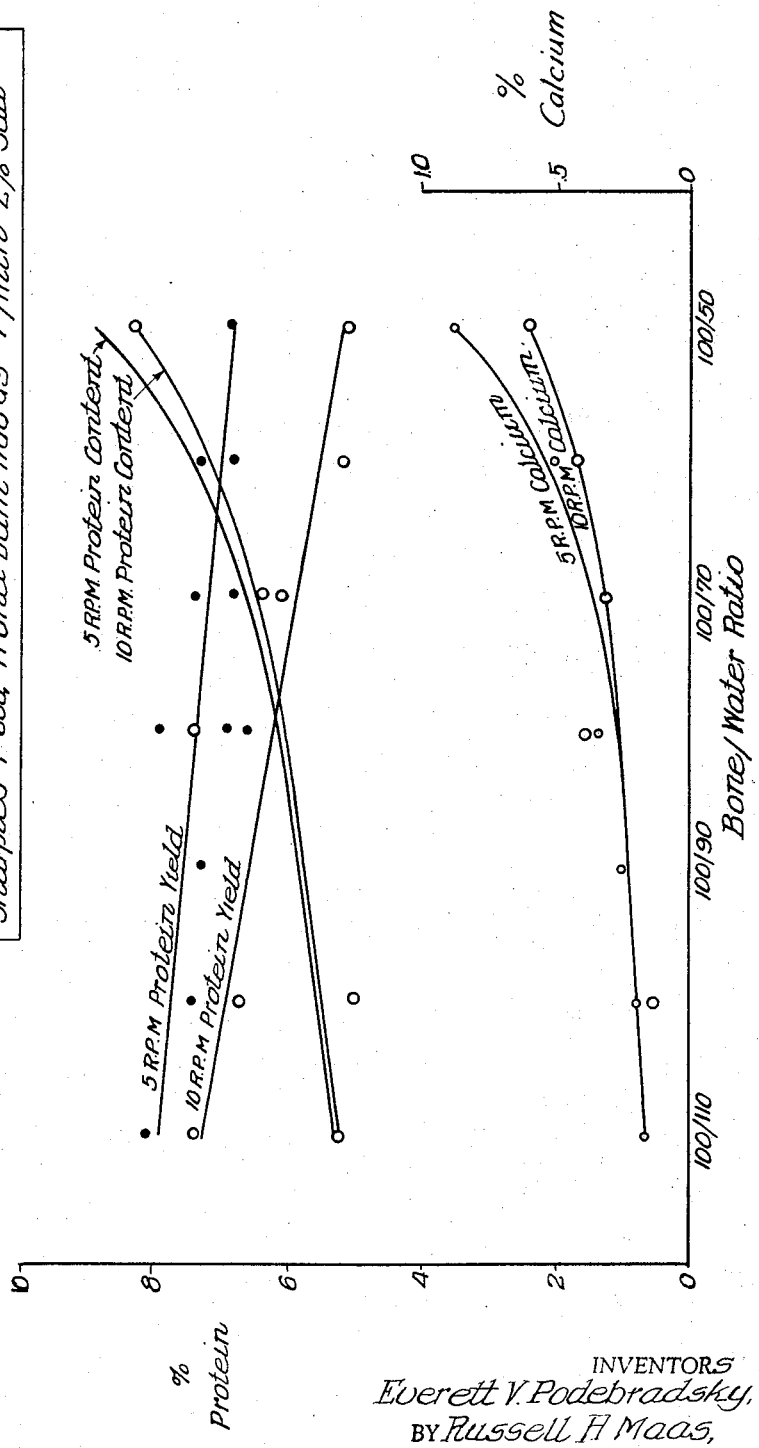

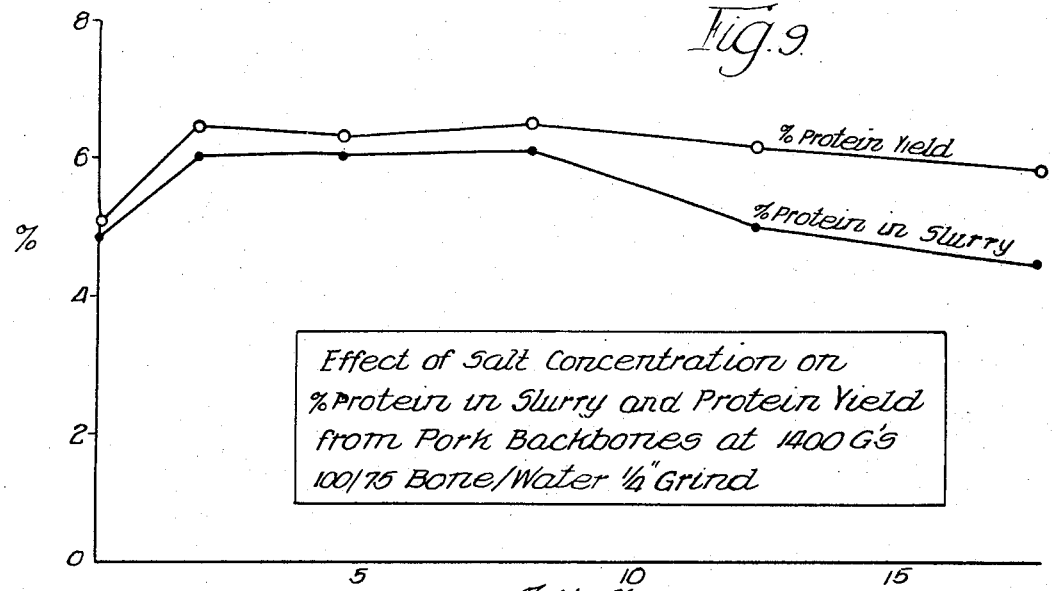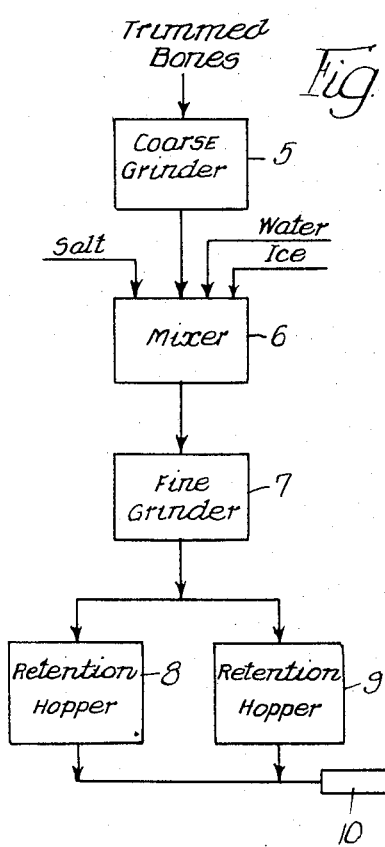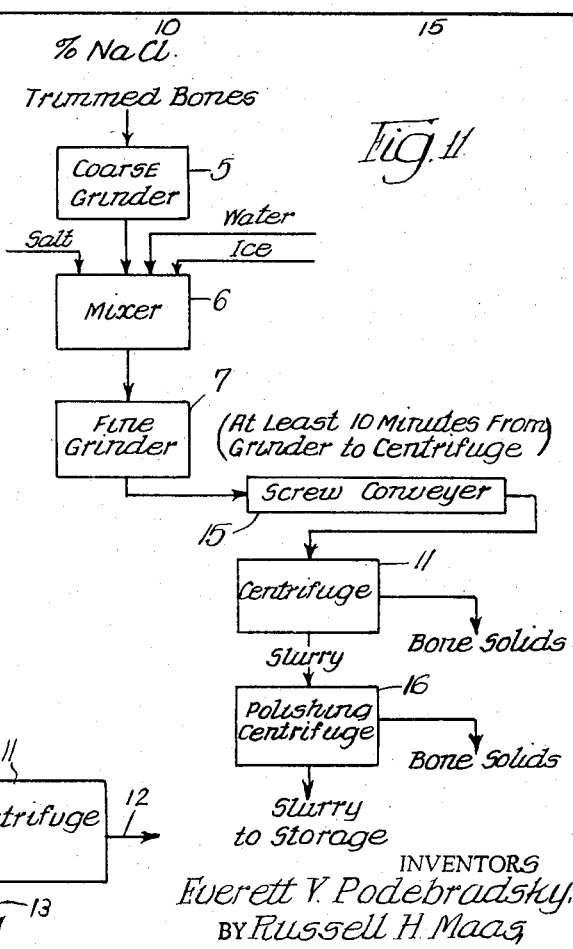

3,353,963
SAUSAGE MANUFACTURE
Everett V. Podebradsky and Russell H. Maas, Madison, Wis., assignors to Oscar Mayer & Co., Inc., Chicago, Ill., a corporation of Illinois
Filed Jan. 23, 1964, Ser. No. 339,704
4 Claims. (Cl. 99—109)

This invention relates, generally, to innovations and improvements in recovering a substantial portion of the residual meat left on trimmed bones in the form of an aqueous slurry of undenatured meat which is particularly suited for use in the manufacture of sausage and meat loaf products.

In the manufacture of sausage and meat loaf products it is customary to prepare a batter or sausage emulsion by chopping the meat and other ingredients in the presence of salt and ice. In accordance with the present invention it has been found (1) that a substantial portion of the red meat left on bones that have been trimmed, either by hand or by such mechanical aids as the Whizard knife, in a meat packing plant may be economically recovered therefrom in the form of a chilled aqueous slurry containing the removed meat in finely divided condition suspended in a slurry in the presence of dissolved salt (sodium chloride) either alone or in combination with other salts, and (2) that such a slurry may be used to advantage in place of all or a portion of the ice or water, and a portion of the salt and of the meat in preparing sausage batter. For example, a typical batch load for a silent cutter to be chopped therein so as to prepare a bologna sausage emulsion would be as follows:

| | Lbs. |
|---|---|
| Beef trim | 200 |
| Pork trim | 300 |
| Ice/water | 100 |
| Salt | 15 |
| Spice and cure | 15 |

In accordance with the present invention preferably all of the ice/water in the foregoing formulation, 25% of the salt, and 13% of the pork may be omitted and in place thereof a chilled slurry may be used which is obtained in accordance with the present invention which will contain water equivalent to the ice/water that is eliminated from the foregoing formulation, as well as salt and pork equivalent to the portions of salt and pork not used. Bologna sausage made with the modified recipe is not noticeably different bologna sausage prepared from conventional ingredients. However, an appreciable reduction in the cost of the sausage is made possible since the undenatured meat provided in the aqueous slurry is substantially cheaper than the replaced whole meat that would ordinarily be used in the recipe.

Trimmed bones are an unavoidable by-product of the conventional slaughtering operation. They contain from a negligible amount up to 40% by weight of meat depending upon how carefully the trimming has been performed and the type of bone. Even with efficient mechanical trimming aids such as the Whizard knife it is uneconomical to remove more of the meat from the bones because of the high cost of labor. While it may have been previously recognized that trimmed bones constitute a potentially low-cost source of undenatured meat that could be used in production of sausage, meat loaf products and the like, it remained for someone to provide an economical method of removing the residual meat, or a substantial portion thereof, that is normally left on trimmed bones.

Patent 3,028,243 to Robertson et al. dated Apr. 3, 1962, and Patent 3,112,203 to Watt dated Nov. 26, 1963, disclose methods of removing meat from bones which have not been trimmed, i.e. from carcass material or primal cuts. It has been reported that the process of Patent 3,028,243 has been used to economically recover meat from raw chicken necks. According to the disclosure of this patent the process may also be used to remove meat from portions of the carcasses of other animals such as from the front quarter of a fresh raw beef, raw fresh sheep fronts and fresh raw lamb chucks. In accordance with the process disclosed in Patent No. 3,028,243 chicken necks, or other untrimmed carcass portions, are first coarsely ground or subdivided and then this intermediate product is finely ground. To the resultant finely ground product water at about room temperature is added so that the mixture is readily pumpable and it is then centrifuged so as to make a separation between the bone particles on the one hand and an aqueous slurry of the finely divided meat on the other.

It has been discovered in accordance with the present invention that trimmed bones may be efficiently de-meated by a process which, in certain respects, is similar to that disclosed in the Robertson et al. Patent 3,028,243 but wherein there are important differences and innovations. More particularly, a suitable salt, or mixture of salts, is present with the added water or ice and the coarsely ground trimmed bones when the same are undergoing fine grinding preliminary to centrifuging. After the fine grinding in the presence of salt the resulting slurry is either allowed to stand for a suitable period, e.g. thirty minutes, or is agitated for 5 to 10 minutes, so as to condition it for centrifuging by effecting solubilization of a substantial portion of the salt soluble protein content of the slurry.

The object of the present invention, generally stated, is the provision of a novel method for economically removing a substantial portion of the residual raw meat from trimmed bones so as to form a cold aqueous slurry of finely divided undenatured meat in the presence of one or more suitable salts, which slurry is free from bone particles and suitable for use as an ingredient in manufacture of sausage products and meat loaf products.

An important object of the invention is the obtaining from trimmed bones of a chilled aqueous slurry of finely ground undenatured meat particles, with the slurry containing substantial amounts of solubilized salt—soluble protein rendering the slurry particularly useful as an ingredient in the manufacture of sausage and meat loaf products.

While the present invention has particular economical utility in removing residual meat from trimmed bones it may also be used to remove meat from untrimmed bones or carcass materials.

Certain other objects of the invention will in part, be obvious, and will in part appear hereinafter.

For a more complete understanding of the nature and scope of the invention reference may now be had to the following detailed description thereof taken in connection with the accompanying drawings wherein:

FIGS. 1-9 contain a plurality of curves that have been plotted using data obtained in performing a number of controlled experiments to investigate variables and effects associated with the process of the present invention;

FIG. 10 is a flow diagram illustrating one embodiment of the invention; and,

FIG. 11 is a flow diagram illustrating another embodiment.

Figure 7:
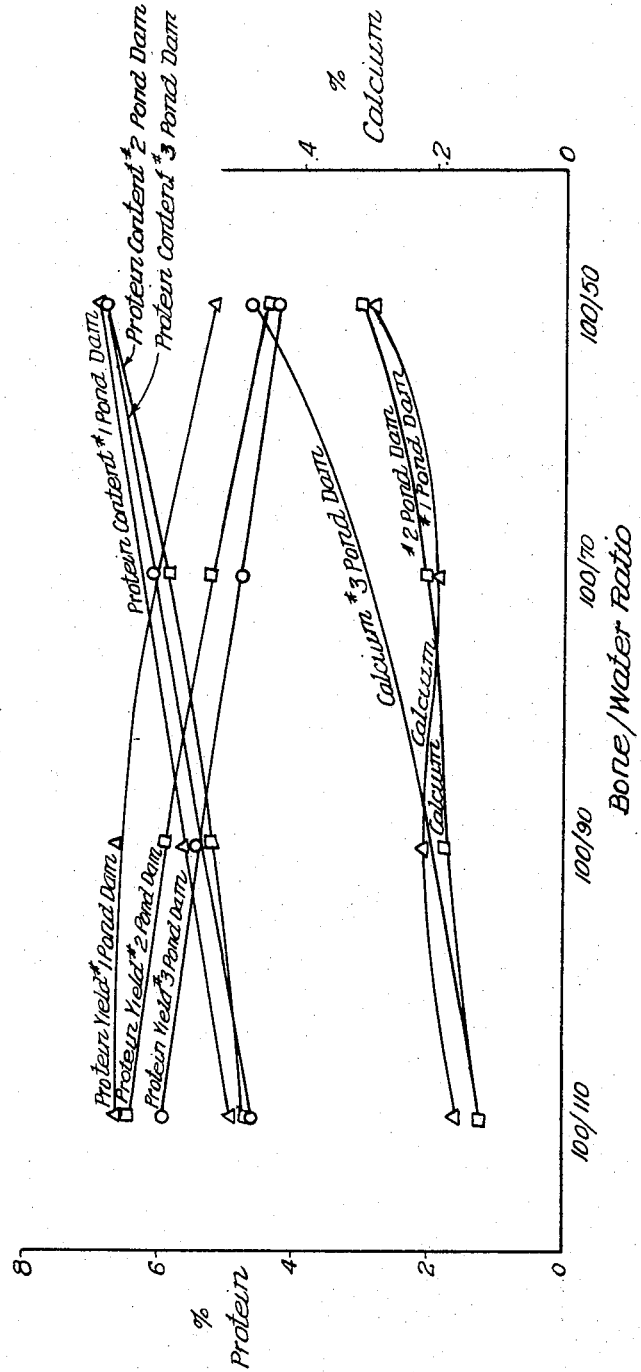

The present invention is applicable generally to trimmed bones on which a normal amount of residual raw meat remains. For example, it may be used very satisfactorily to de-meat pork neck bones, pork back bones, blade bones, ox tails, etc. Normally, the first step in the process is the coarse grinding, crushing or breaking of the trimmed bones and this step may be readily carried out in a commercial grinder equipped with a plate having holes ranging from about 3/4" to 1" in diameter. To the coarsely ground trimmed bones there are added the proper amounts of ice, water and salt with the mixture being blended prior to introduction into a grinder equipped with a plate having holes approximately 1/4" in diameter. The product emerging from this fine grinder is in the form of a cold slurry containing fine particles of raw meat and of bone in suspension. Instead of using a plate with 1/4" holes, similar results may be obtained by using a plate with 1/2" holes combined with violent agitation.

Prior to centrifuging to remove bone particles, the slurry is preferably either allowed to stand for at least about 30 minutes, or it is agitated for at least about 5 minutes, during which time the salt or brine in the menstruum solubilizes a substantial portion of the salt-soluble protein in the meat particles. After the solubilization of the salt-soluble protein the thus conditioned slurry is introduced into a suitable centrifuge or other separating means wherein a separation is effected between the bone particle solids on the one hand and the balance of the mixture which emerges as a bone-free slurry of finely divided meat in an aqueous menstruum of solubilized salt-soluble protein which is suitable for use in the manufacture of sausage products. While the slurry may be centrifuged immediately following fine grinding without being conditioned so as to effect solubilization of a substantial portion of the salt-soluble protein, neither the protein yield nor the protein content of the slurry will be as high as obtained when the slurry is conditioned.

Referring to the flow-diagram shown in FIG. 10, one plant installation is illustrated for removing meat from bones in accordance with the present invention. Trimmed bones (e.g. pork back bones) are fed into a coarse grinder 5 equipped with a plate the openings of which may range from 3/4" to 1" in diameter. A suitable commercial type grinder for performing this step would be a Buffalo 66B meat grinder or a Rietz prebreaker. The coarsely ground or crushed trimmed bones with only a little of the residual meat removed therefrom are delivered into a mixer 6, which may for example be a mixer equipped with agitator paddles, with a spiral or ribbon type of agitator, or with some other means for agitation and blending. Into the mixer 6 salt, water and ice are also added. The blended mixture discharges from the mixer 6 in the form of a coarse slurry and is delivered into a fine grinder 7 equipped with a plate having 1/4" openings therein. This fine grinder may be of known type such for example as a conventional meat grinder Buffalo 66B or a Rietz disintegrator. The material emerging through the plate of the fine grinder 7 is in the form of a thin pumpable slurry the temperature of which will be approximately from 26° to 50° F. This fine slurry is collected in one of a plurality of retention hoppers 8 and 9 where it is held for about thirty minutes during which it becomes conditioned for centrifuging and separation of bone particles. The conditioned contents of each hopper 8 and 9 are alternately conveyed into the inlet connection of a Moyno pump 10 which has the discharge connection thereof connected to the inlet or feed connection of a centrifuge 11 of known type. The centrifuge discharges slurry free of bone particles through one connection 12 and discharges bone solids through a connection 13.

Any suitable type of centrifuge of suitable capacity and with the ability to produce at least approximately 750 gravities (G's) may be used. For example, both a Reineveld centrifuge and a Sharples P600 continuous discharge centrifuge have been used with satisfactory results. The Reineveld centrifuge is of the basket type equipped with a blade to remove the solids. Such centrifuges may be used or operated by either the continuous overflow method or the batch method. Other known types of centrifuges of suitable capacity and which develop adequate centrifugal force may be utilized.

In the embodiment illustrated in FIG. 11 the slurry from the fine grinder 7 discharges into the inlet end of an elongated screw conveyor 15. It takes the slurry about ten minutes to pass through the conveyor 15 during which time it is undergoing agitation and the salt-soluble protein has an opportunity to become adequately solubilized. The conveyor-agitator 15 discharges into a centrifuge 11 and is separated into bone solids and bone-free slurry therein as described in connection with FIG. 10. The bone-free slurry is delivered into a polishing centrifuge 16 which separates any residual bone particles from the slurry thereby permitting the centrifuge 11 to operate at a somewhat higher capacity since minor amounts of bone particles may be allowed to remain in the discharge slurry for removal in the centrifuge 16.

The following examples will serve to further describe and illustrate the invention.

EXAMPLE 1

Fifty pounds of pork back bones were ground through a 3/4" plate. To the coarsely ground backbones there was added 20 pounds of ice, 30 pounds of tap water, 2 pounds of sodium chloride and 0.25 pound of sodium tripolyphosphate. These materials were mixed with a paddle to obtain uniformity and then the mixture was ground through a 1/4" plate. After the finely ground mixture had been allowed to stand for 30 minutes it was centrifuged in a Sharples P600 machine with the dam setting being No. 1, the bowl speed being approximately 6,000 r.p.m. (approximately 3,200 G's), the auger-bowl differential being 20 r.p.m., and the feed rate being approximately 8 pounds per minute. The slurry that was discharged from the centrifuge was free of bone particles and had the following analysis:

| | Percent |
|---|---|
| Moisture | 77.5 |
| Protein | 4.9 |
| Fat | 14.4 |
| Salt | 2.3 |
| Calcium | 0.1 |

EXAMPLE 2

Fifty pounds of pork backbones were ground through a 1" plate. Twenty pounds of ice, 30 pounds of water and 2 pounds of common salt were added to the coarsely ground bones. The resulting mixture was stirred with a paddle to obtain uniformity and then the batch was ground through a 1/4" plate. After standing approximately 1/2 hour after being ground through the 1/4" plate, the material was introduced into a centrifuge at the rate of 7 pounds per minute. The pond dam setting was No. 1, the bowl speed was 6,100 r.p.m. (approximately 3,200 G's) and the auger-bowl speed differential was 20 r.p.m. The temperature of the slurry was 29° F. The collected slurry discharged from the centrifuge was free of bone particles and weighed 51.5 pounds, while the bone solids discharged from the centrifuge weighed 28 pounds. The slurry had the following analysis:

| | Percent |
|---|---|
| Moisture | 77.4 |
| Protein | 5.1 |
| Fat | 14.9 |
| Salt | 2.3 |
| Calcium | 0.13 |

Based on the original weight of the bones, the recovery of protein was 6.7% and the recovery of fat was 19.7%.

EXAMPLE 3

Fifty pounds of pork backbones were ground through a 1″ plate. Twenty pounds of ice, 20 pounds of water and 1½ pounds of salt (NaCl) were added to the bones. After stirring with a paddle to obtain uniformity, the material was ground through a ¼″ plate. After fine grinding, the material was agitated slowly for ½ hour before centrifuging. The material was pumped by a Moyno pump into a Reineveld centrifuge spinning at 2,900 r.p.m. (approximately 1,400 G's). After spinning for one minute the liquid fraction was skimmed with a pipe skimmer and the solids were removed with the blade. The liquid fraction weighed 53 pounds and the solid fraction weighed 38½ pounds. Analyses on the liquid fraction and solid fraction were as follows:

*Liquid fraction*

| | Percent |
|---|---|
| Moisture | 77.3 |
| Protein | 6.1 |
| Fat | 14.0 |
| Salt | 1.7 |
| Calcium | 0.09 |

*Solid fraction*

| | Percent |
|---|---|
| Moisture | 55.6 |
| Protein | 16.5 |
| Fat | 5.8 |
| Salt | 1.2 |
| Calcium | 7.5 |

Based on the original weight of the bones the recovery of protein was 6.5% and the recovery of fat was 14.8%. It was estimated that the trimmed pork bones used in this example comprised about ⅓ meat and ⅔ bone.

A number of changes may be made in the foregoing examples. Thus, each of these examples may be carried out in larger batches or in a continuous manner in a system such as shown in FIG. 11. In place of pork backbones, other trimmed bones may be used such as pork neck bones, blade bones, ox tails, etc.

It will be appreciated that several different systems or arrangement of equipment or apparatus may be employed with the result that some of the pieces of equipment may be operating continuously while others are being operated intermittently or in a batch-wise manner. For example, the coarse grinder 5 may be operated continuously or there can be two or more mixers 6 so that the mixers 6 are operated intermittently in a batch-wise manner. Thus, each mixer is separately loaded with the coarsely ground bones, ice, water and salt and then the mixing operation is carried out in a loaded mixer while the other is being filled. Several mixers can be used alternately to feed one continuously operating fine grinder 7 which discharges into two or more retention hoppers 8, 9, etc. so that while one hopper is being used to feed the centrifuge 11, a second hopper is being filled from the fine grinder 7, while the contents of a third hopper are being retained therein for at least about ½ hour. Thus, the grinders 5 and 7, the pump 10, and the centrifuge 11 may be operated in a continuous manner whereas the mixers and retention hoppers would be operated batch-wise.

A number of experiments were carried out to ascertain the effects of various variables and to ascertain preferred or optimum operating conditions or process variables. The results of these experiments will now be described in connection with FIGS. 1–9.

The protein content of a bone free slurry prepared from pork backbones, containing 2% salt and centrifuged at 3,200 G's, may be controlled by the bone/water ratio of the feed. Thus, FIG. 1 illustrates that by decreasing the quantity of water added to the bone, the protein content of the slurry is increased but at the same time the protein yield from the bones is decreased. The two curves in FIG. 2 show the effect of the bone/water ratio on protein concentration of pork backbone slurries centrifuged at 1,700 G's and 3,200 G's. The curves in FIG. 3 show the effect of the bone/water ratio on the protein yields of pork backbone slurries centrifuged at 1,700 G's and 3,200 G's. Both the concentration of protein and the protein yield were higher at 1,700 G's than at 3,200 G's. These differences are due to the separation of more connective tissue into the solids at the higher centrifugal force. In general from 0.5 to 2 parts by weight of ice and/or water are mixed with each part by weight of the bones.

A primary purpose of testing the effects of high centrifugal forces was to reduce the calcium content of the finished slurry. The two curves in FIG. 4 show the results of tests that were made on the calcium content of slurries centrifuged at 1,700 G's and 3,200 G's with the slurry containing different bone/water ratios. It is apparent from FIG. 4 that as the water added to the bones is reduced (i.e. as the slurry becomes thicker or concentrated) the calcium content of the slurry is increased. However, at the higher centrifugal force of 3,200 G's the calcium content does not increase as rapidly as it does at the lower centrifugal force of 1,700 G's.

In FIG. 5 are plotted the results of tests made to correlate calcium content versus protein concentration of slurries centrifuged at 1,700 G's and 3,200 G's. These curves indicate that the higher centrifugal force becomes more effective in reducing calcium content of the slurry at higher protein concentrations. In other words, at protein concentrations up to 5% the calcium content of the slurry was not appreciably different at the different centrifugal forces. However, as the protein content is increased up to approximately 7% then the calcium content is not as high for the slurry centrifuged at 3,200 G's as it is for the one centrifuged at the lower centrifugal force.

The effect of the speed differential between the auger and the bowl of the centrifuge with respect to protein yield, protein content and calcium content are shown in FIG. 6. The data shown in FIG. 6 was obtained with slurries of varying bone/water ratios as indicated. It is apparent from the curves in FIG. 6 that the smaller speed differential between auger and bowl (e.g. 5 r.p.m.) resulted in higher protein yields, with little effect on calcium or protein contents of the slurry up to bone/water ratios of about 100/70. At higher bone/water ratios the calcium content, and to a lesser extent the protein content, of the slurry increases more rapidly at the lower auger speed differential.

The curves in FIG. 7 serve to bring out that the shallow pond depths (i.e. settings Nos. 1 and 2) are the most desirable since the calcium content of the slurry is lowest and the protein yields are the highest. At the deepest pond setting, No. 4 the centrifuge did not function since most of the feed went into the solids.

The data plotted in FIG. 8 show that both protein content and protein yield are increased in the presence of salt. Examining FIG. 8 it is seen that as the amount of water added to the bone is reduced the protein content rises and the protein yield decreases, both in a nearly parallel manner comparing slurries with and without salt. The protein yield is about 18% lower without salt at the 100/70 bone/water ratio and the percentage decrease in yield becomes greater as the slurry becomes thicker.

Tests were conducted to determine whether the addition of phosphates to the slurry would have any effects upon protein recovery and calcium removal. In addition to 2% salt, 0.25% sodium tripolyphosphate was added in one test. In another, 0.25% tetra sodium pyrophosphate was added in addition to the 2% salt. Tests with the phosphates added indicated that in the presence of added phosphate both lower calcium and protein contents are obtained. The results of these tests are given in Table 1 below.

TABLE 1

| Additives | Protein Yield, Percent | Fat Yield, Percent | Protein Content of Slurry, Percent | Fat Content of Slurry, Percent | Calcium Content of Slurry, Percent |
| --- | --- | --- | --- | --- | --- |
| 2% sodium chloride, .25% sodium tripolyphosphate | 6.51 | 19.2 | 4.9 | 14.4 | .10 |
| 2% sodium chloride, .25% tetra sodium pyrophosphate | 6.35 | 20.0 | 4.7 | 14.8 | .09 |
| 2% sodium chloride | 6.73 | 19.7 | 5.1 | 14.9 | .13 |

The two curves in FIG. 9 illustrate the effect of different salt concentrations on (a) protein yield from pork backbones and (b) concentration of protein in the slurries, at a bone/water ratio of 100/75. It will be seen that the addition of about 2% salt resulted in both maximum protein yield and maximum protein concentration. Additional salt had little effect until beyond about the 8% level where at both the protein concentration and yield decreased as the salt level was increased. Hence, from these data it appears that a 2% salt concentration (i.e. about 2% of the combined weight of the ground bones, ice and water) is optimum, although up to about 8% may be used.

As a result of the various tests that were performed it was determined that the addition of salt to the bones in the process resulted in the following important effects: (1) the viscosity of the slurry can be controlled to an appreciable extent by the gelation effect of salt-solution protein; (2) the slurry is more homogeneous, with much less tendency to separate into layers; (3) the yield of recoverable protein is increased and is more suitable for sausage making; and (4) the salt has a preservative effect on the slurry for short term storage.

While the invention is especially useful for economically recovering a substantial portion of residual meat on trimmed bones, the foregoing important effects are also obtained when the process is used to separate meat from untrimmed bones including untrimmed poultry bones. Such separation is much easier accomplished than is the recovery of a bone-free meat slurry from trimmed bones.

It will be apparent that other embodiments and changes may be adopted without departing from the spirit and scope of this invention.

We claim:

1. The method of obtaining from trimmed bones an aqueous slurry of undenatured meat which may be used in the manufacture of sausage products which comprises grinding a mixture of trimmed bones having residual meat thereon, ice, water and at least about 2% by weight of sodium chloride based on the combined weights of bones, ice and water in said mixture to form a cold slurry, allowing said slurry to stand so as to solubilize a substantial portion of the salt-soluble protein content of said cold slurry, and separating said cold slurry, and separating said cold slurry into a substantially bone-free slurry fraction and a solids fraction containing the bone particles.

2. The method of obtaining from trimmed bones an aqueous slurry of undenatured meat suitable for use in the preparation of sausage batter which comprises coarsely grinding trimmed bones having residual meat thereon through a plate having holes ranging from about ¾" to about 1", mixing with the ground bones from about 0.5 to 2 parts by weight of ice and water for each part by weight of ground bones and sufficient sodium chloride to equal about 2% of the combined weight of the ground bones, ice and water, finely grinding said mixture through a plate having approximately ¼" to ½" openings to form a cold slurry, allowing the salt to solubilize a substantial portion of the salt-soluble protein content of said slurry and centrifuging said cold slurry into a substantially bone-free fraction and into a solids fraction containing substantially all the bone particles.

3. The method of obtaining from trimmed bones an aqueous slurry of denatured meat suitable for use in the preparation of sausage batter which comprises coarsely grinding trimmed bones having residual meat thereon through a plate having holes ranging from about ¾" to 1", mixing with 50 parts by weight of the coarsely ground bones approximately 20 parts by weight of ice and from about 20 to 30 parts by weight of water, and from about 1.5 to 2 parts of sodium chloride, finely grinding said mixture through a plate having approximately ¼" to ½" openings to form a cold slurry having a temperature of from about 26 to 50° F., allowing the salt to solubilize a substantial portion of the salt-soluble content of said slurry, and centrifuging said cold slurry into a substantially bone-free fraction and into a solids fraction containing substantially all of the bone particles.

4. The method of obtaining from trimmed bones an aqueous slurry of undenatured meat which may be used in the manufacture of sausage products which comprises grinding a mixture of trimmed bones having residual meat thereon, ice, water, and at least about 2% by weight of sodium chloride based on the combined weights of bones, ice and water in said mixture to form a cold slurry, agitating said slurry so as to solubilize a substantial portion of the salt-soluble protein content of said cold slurry, and separating said cold slurry into a substantially bone-free slurry fraction and a solids fraction containing the bone particle.

References Cited

UNITED STATES PATENTS

| | | | |
| --- | --- | --- | --- |
| 2,828,018 | 3/1958 | Chayen | 99—107 |
| 3,028,243 | 4/1962 | Robertson et al. | 99—107 |
| 3,050,399 | 8/1962 | Kielsmeier et al. | 99—109 |
| 3,112,203 | 11/1963 | Watt | 99—107 |

HYMAN LORD, Primary Examiner.

A. LOUIS MONACELL, Examiner.